(12) United States Patent
Umeda

(10) Patent No.: US 8,331,237 B2
(45) Date of Patent: Dec. 11, 2012

(54) SUPERVISORY CONTROL METHOD AND SUPERVISORY CONTROL DEVICE

(75) Inventor: Kenji Umeda, Tokyo (JP)

(73) Assignee: NEC Corporation, Tokyo (JP)

( * ) Notice: Subject to any disclaimer, the term of this patent is extended or adjusted under 35 U.S.C. 154(b) by 549 days.

(21) Appl. No.: 12/353,145

(22) Filed: Jan. 13, 2009

(65) Prior Publication Data

US 2010/0020705 A1    Jan. 28, 2010

(30) Foreign Application Priority Data

Jan. 17, 2008    (JP) .................................. 2008-007558

(51) Int. Cl.
*H04J 1/16* (2006.01)

(52) U.S. Cl. ......... 370/236; 370/229; 370/230; 370/235

(58) Field of Classification Search .................. 370/235, 370/230, 232, 241.1, 252, 391, 392, 338, 370/400, 401, 350, 351, 352, 321, 328, 447, 370/236, 229, 234, 237; 455/453, 452.2, 455/446, 436, 456.1, 456.5, 569, 561; 709/223, 709/224, 227, 203, 238, 230
See application file for complete search history.

(56) References Cited

U.S. PATENT DOCUMENTS

| | | | |
|---|---|---|---|
| 6,744,780 B1 * | 6/2004 | Gu et al. ......................... | 370/450 |
| 6,781,988 B1 | 8/2004 | Gotoh et al. | |
| 6,801,774 B1 * | 10/2004 | Haakana et al. ............... | 455/446 |
| 6,813,244 B1 * | 11/2004 | He et al. ........................ | 370/235 |
| 7,046,627 B1 * | 5/2006 | Dejanovic et al. ............. | 370/230 |
| 7,358,899 B1 * | 4/2008 | Ville et al. ..................... | 342/458 |
| 7,490,145 B2 * | 2/2009 | Sylor et al. ..................... | 709/224 |
| 2002/0049838 A1 * | 4/2002 | Sylor et al. ..................... | 709/224 |
| 2002/0083193 A1 * | 6/2002 | Terefenko ...................... | 709/238 |
| 2003/0153326 A1 * | 8/2003 | Jenzowsky et al. ............ | 455/453 |
| 2004/0039550 A1 * | 2/2004 | Myers ............................ | 702/186 |
| 2004/0039968 A1 * | 2/2004 | Hatonen et al. ................. | 714/39 |
| 2004/0088406 A1 * | 5/2004 | Corley et al. ................... | 709/224 |
| 2004/0103193 A1 * | 5/2004 | Pandya et al. .................. | 709/224 |
| 2004/0233846 A1 * | 11/2004 | Khandani et al. .............. | 370/235 |
| 2005/0132062 A1 * | 6/2005 | Halme ........................... | 709/227 |
| 2006/0085680 A1 | 4/2006 | Matsuno et al. | |
| 2006/0153089 A1 * | 7/2006 | Silverman ..................... | 370/252 |
| 2006/0212556 A1 * | 9/2006 | Yacoby et al. ................. | 709/223 |
| 2006/0259984 A1 * | 11/2006 | Juneau ............................ | 726/28 |
| 2007/0064736 A1 * | 3/2007 | Miriyala et al. ............... | 370/469 |

(Continued)

FOREIGN PATENT DOCUMENTS

CN    1661968 A    8/2005

(Continued)

OTHER PUBLICATIONS

Partial European Search Report for EP 09 15 0364 mailed Mar. 29, 2012.

(Continued)

*Primary Examiner* — Abdullah Riyami

(57) ABSTRACT

A supervisory control device for a network having a plurality of network elements, includes: a communication interface which is connected to each of a plurality of element groups, wherein the plurality of network elements is grouped into the plurality of element groups; and a controller for controlling supervisory control information in element group units depending on a communication condition change for at least one network element belonging to each element group, wherein the supervisory control is performed according to the supervisory control information.

10 Claims, 5 Drawing Sheets

U.S. PATENT DOCUMENTS

| | | |
|---|---|---|
| 2007/0180077 A1 | 8/2007 | Letca et al. |
| 2007/0217425 A1* | 9/2007 | Claise et al. ............... 370/392 |
| 2008/0005321 A1 | 1/2008 | Ma et al. |
| 2008/0016115 A1* | 1/2008 | Bahl et al. ............... 707/104.1 |
| 2008/0108345 A1* | 5/2008 | Calin et al. ............... 455/424 |
| 2008/0228914 A1* | 9/2008 | Ofel et al. ............... 709/224 |
| 2008/0229415 A1* | 9/2008 | Kapoor et al. ............... 726/22 |
| 2009/0180451 A1* | 7/2009 | Alpert et al. ............... 370/338 |
| 2009/0245252 A1* | 10/2009 | Konishi et al. ............... 370/390 |
| 2010/0128762 A1* | 5/2010 | Nabetani et al. ............... 375/219 |
| 2010/0165840 A1* | 7/2010 | Khan et al. ............... 370/232 |
| 2010/0254387 A1* | 10/2010 | Trinh et al. ............... 370/392 |

FOREIGN PATENT DOCUMENTS

| | | |
|---|---|---|
| JP | 1996223191 A | 8/1996 |
| JP | 1998327148 A | 12/1998 |
| JP | 2006338543 A | 12/2006 |

OTHER PUBLICATIONS

Japanese Office Action for JP2008-007558 issued Jan. 11, 2012.
Chinese Office Action for CN200910002462.6 issued Jan. 31, 2012.

* cited by examiner

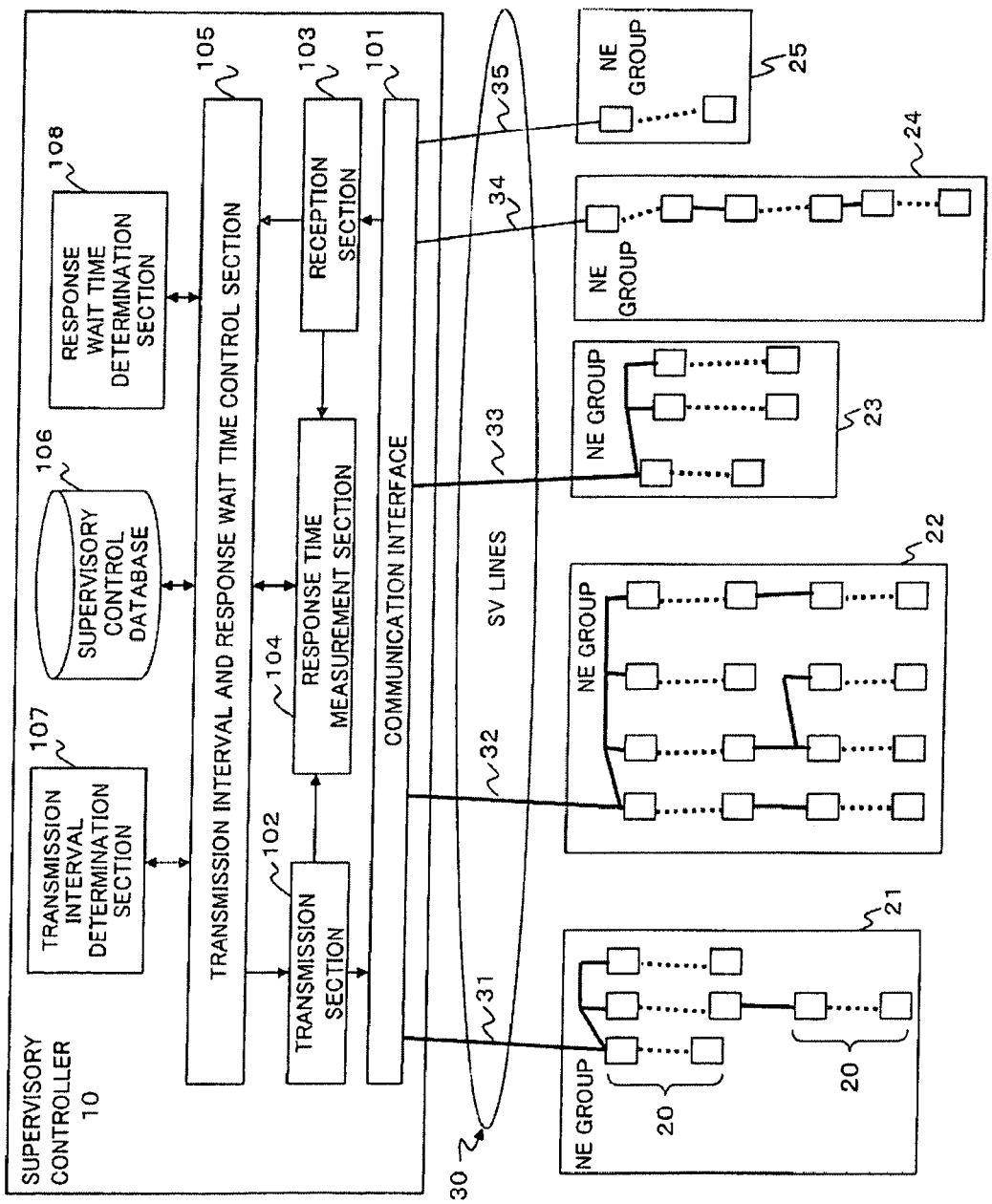

FIG. 3A

| NE-ID | GROUP INFORMATION | NORMAL RESPONSE TIME | MEASURED RESPONSE TIME |
|---|---|---|---|
| 001 | NE GROUP 21 | T1 | t1 |
| 002 | NE GROUP 24 | T2 | t2 |
| 003 | NE GROUP 23 | T3 | t3 |
| 004 | NE GROUP 22 | T4 | t4 |
| 005 | NE GROUP 21 | T5 | t5 |
| 006 | NE GROUP 25 | T6 | t6 |
| ... | ... | ... | ... |

FIG. 3B

| NE GROUP | AVERAGE NORMAL RESPONSE TIME | AVERAGE MEASURED RESPONSE TIME | OPTIMAL TRANSMISSION INTERVAL | OPTIMAL RESPONSE WAIT TIME |
|---|---|---|---|---|
| NE GROUP 21 | Tg1 | tg1 | INTtx1 | Tw1 |
| NE GROUP 22 | Tg2 | tg2 | INTtx2 | Tw2 |
| NE GROUP 23 | Tg3 | tg3 | INTtx3 | Tw3 |
| NE GROUP 24 | Tg4 | tg4 | INTtx4 | Tw4 |
| NE GROUP 25 | Tg5 | tg5 | INTtx5 | Tw5 |

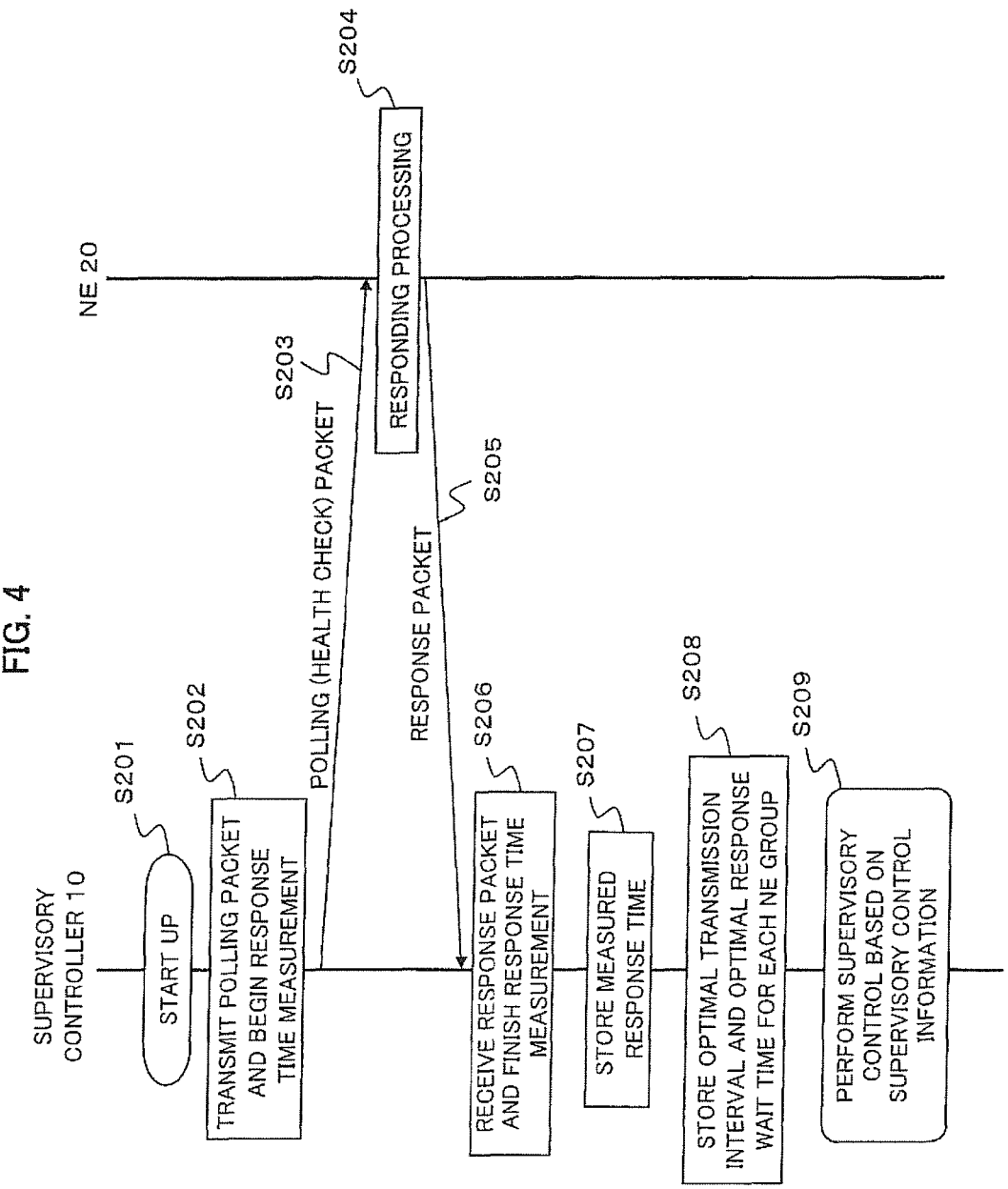

SUPERVISORY CONTROL METHOD AND SUPERVISORY CONTROL DEVICE

This application is based upon and claims the benefit of priority from Japanese Patent Application No. 2008-007558, filed on Jan. 17, 2008, the disclosure of which is incorporated herein in its entirety by reference.

BACKGROUND OF THE INVENTION

1. Field of the Invention

The present invention relates to a supervisory control method and device for a network including a plurality of communication devices.

2. Description of the Related Art

In a network monitoring system in which the states of a plurality of communication devices are monitored by using a polling scheme, an inquiry is sent to each communication device and the state of each communication device is determined depending on whether or not a response is received. For example, referring to FIG. 1, a supervisory controller 1 sends a polling packet (health check packet) to each of communication devices 2 in predetermined order (S1). If the supervisory controller 1 receives a response packet to the polling packet from a communication device 2 within a predetermined period of time (S2), the supervisory controller 1 can confirm the soundness of the communication device 2, which is a target of monitoring. Hereinafter, the elapsed time from the transmission of an inquiry (polling packet) until the receipt of a response (response packet) will be referred to as "response time," the predetermined time for which the supervisory controller 1 waits for a response will be referred to as "response wait time," and the interval at which an inquiry (polling packet) is sent will be referred to as "polling interval" or "transmission interval."

Various techniques have been proposed regarding polling-based supervisory control. For example, Japanese Patent Application Unexamined Publication No. H8-223191 discloses a health check system in which the response wait time is set for each device based on statistics on the response time of the device, whereby health checking is performed according to the processing load on each device.

Moreover, Japanese Patent Application Unexamined Publication No. H10-327148 discloses a communication network management method in which an increase in traffic caused by polling is avoided by varying the intervals (transmission intervals) at which a management device sends a diagnostic request, depending on the state of the network traffic.

However, in a case where a single supervisory controller monitors a large number of communication devices, the load on the supervisory controller is increased if the response wait time is set for each individual communication device, or if the polling intervals are dynamically varied with changes in the state of communication.

SUMMARY OF THE INVENTION

Accordingly, an object of the present invention is to provide a supervisory control method and system that can reduce the load of supervisory control.

According to the present invention, a device for supervisory control of a network having a plurality of network elements, includes: a communication interface which is connected to each of a plurality of element groups, wherein the plurality of network elements is grouped into the plurality of element groups; and a controller for controlling supervisory control information in element group units depending on a communication condition change for at least one network element belonging to each element group, wherein the supervisory control is performed according to the supervisory control information.

According to the present invention, it is possible to reduce the load of supervisory control caused in response to a change in the state of communication.

BRIEF DESCRIPTION OF THE DRAWINGS

FIG. 2 is a schematic diagram of a supervisory control system according to an exemplary embodiment of the present invention.

FIG. 3A is a table of response times of individual network elements, showing a part of an exemplary supervisory control database provided to a network management system according to the present exemplary embodiment.

FIG. 3B is a table of supervisory control information on individual NE groups, showing a part of the exemplary supervisory control database provided to the network management system according to the present exemplary embodiment.

FIG. 4 is a sequence diagram showing polling operation when the supervisory controller 10 is started up, according to an example of the present invention.

DETAILED DESCRIPTION OF THE PREFERRED EMBODIMENTS

1. Exemplary Embodiment

1.1) Outline of Supervisory Control System

Figure 1:
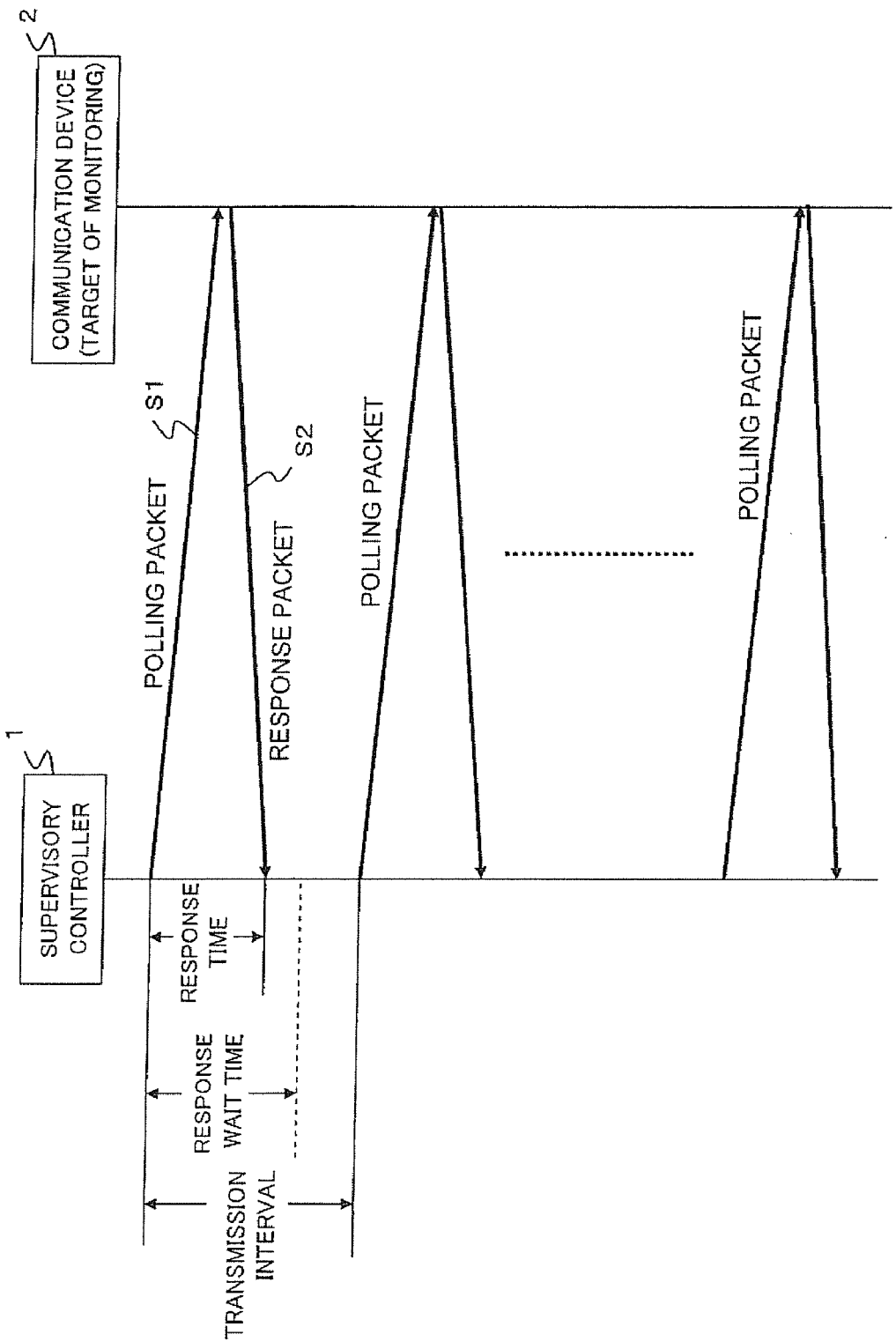
FIG. 1 is a sequence diagram showing an example of polling operation.

FIG. 2 is a schematic diagram of a supervisory control system according to an exemplary embodiment of the present invention. Here, description will be given of a case where a single supervisory controller (hereinafter, also referred to as "network management system" or "NMS") monitors a plurality of communication devices (hereinafter, also referred to as "network element or "NE") which are grouped into a plurality of groups, through supervisory communication lines. Hereinafter, a supervisory communication line will be referred to as "SV line".

The supervisory controller 10 monitors the individual states of the plurality of network elements 20 under its control, through the SV lines 30. Regarding network layout or network topology, although various types of topology are practicable, such cases that the network elements 20 are connected in series and that the network elements 20 are connected in parallel, it is assumed in the present exemplary embodiment to use a network in which some groups of network elements 20 (hereinafter, also referred to as "NE group") are each connected to the supervisory controller 10 through the SV lines 30. In such a grouping-based network, congestions and delays occur in group units in many cases. According to the present exemplary embodiment, an attempt is made to reduce the processing load by performing supervisory control in group units.

Hereinafter, to avoid complicating the description, an example of the network will be illustrated in which five NE groups 21 to 25 are connected to the supervisory controller 10 in parallel through SV lines 31 to 35, respectively. Note that, in FIG. 2, a wired connection between network elements 20 is indicated by a solid line, and a wireless connection between network elements 20 is indicated by a broken line. If applying the network shown in FIG. 2 to a mobile communications system, each network element 20 corresponds to a base station.

The SV lines 31 to 35 are communication lines through which the supervisory controller 10 exchanges signals required to monitor the states of the individual network elements 20, such that inquiry signals are transmitted from the supervisory controller 10 and response signals are transmitted from the network elements 20. The SV lines 31 to 35 may be wired lines or may be radio links. Moreover, the SV lines 31 to 35 may be lines set on a public network or private network. The SV lines 31 to 35 may also transmit inquiry packets and response packets through a packet network.

1.2) Configuration of Network Management System

The supervisory controller 10 performs the above-mentioned transmission of an inquiry signal and reception of a response signal to and from each network element 20 through a communication interface 101 and the SV lines 31 to 35, thereby monitoring the state of each network element 20. More specifically, a transmission section 102 transmits an inquiry signal to each network element 20, and a reception section 103 receives a response signal from that network element 20. A response time measurement section 104 measures the response time for each network element 20, based on the time of transmission at which an inquiry signal is transmitted and the time of reception at which a response signal to the inquiry signal is received, and notifies the measured response time to a transmission interval and response wait time control section 105.

The transmission interval and response wait time control section 105, as will be described later, performs control for inquiry signal transmission and response signal reception in accordance with supervisory control information, which is stored in a supervisory control database 106. The supervisory control information contains at least an optimal transmission interval and an optimal response wait time, which can be updated during operation by a transmission interval determination section 107 and a response wait time determination section 108, respectively.

The supervisory control database 106 stores, for each of the network elements 20, a measured response time measured by the response time measurement section 104 and its normal response time, and also stores, for each of the NE groups 21 to 25, an optimal transmission interval and an optimal response wait time, which are determined by the transmission interval determination section 107 and the response wait time determination section 108, respectively. Here, the optimal transmission interval is an interval between inquiry transmissions which is optimized for each NE group. The optimal response wait time is a response wait time which is optimized for each NE group. Additionally, the optimal transmission interval and the optimal response wait time will also be referred to as supervisory control information collectively where appropriate.

FIGS. 3A and 3B are diagrams showing an example of the supervisory control database provided to the network management system according to the present exemplary embodiment. FIG. 3A shows a table of the response times of the individual network elements, and FIG. 3B shows a table of the supervisory control information on the individual NE groups.

The response time table shown in FIG. 3A stores at least group information, a normal response time, and a measured response time, in association with the identification information on each network element 20 (NE-ID). The group information indicates the group to which a network element 20 in question belongs. In the example shown in FIG. 3A, for example, a network element with NE-ID="001" belongs to the NE group 21, has a normal response time of T1, and has a measured response time of t1. A network element with NE-ID="002" belongs to the NE group 24, has a normal response time of T2, and has a measured response time of t2. The normal response time is a response time measured in a state where no congestion is occurring at the time of system startup. A change in the state of communication can be detected by comparing this normal response time with a response time during operation. Alternatively, the normal response time can also be obtained by calculating the average of a plurality of measurement results. Note that the response time table may also store an optimal transmission interval and an optimal response wait time for each network element 20.

The supervisory control information table shown in FIG. 3B stores at least an optimal transmission interval and an optimal response wait time for each NE group. In the example shown in FIG. 3B, the table also stores an average normal response time and an average measured response time for each NE group. Each of the average normal response times Tg1 to Tg5 is a value obtained by calculating the average of the normal response times shown in FIG. 3A for each NE group. Each of the average measured response times tg1 to tg5 is a value obtained by calculating the average of the measured response times shown in FIG. 3A for each NE group. However, it is also possible that the transmission interval and response wait time control section 105 calculates the average measured response time by referencing the measured response times in the response time table when necessary, without the average measured response times tg1 to tg5 being stored in the supervisory control information table.

Each of the optimal transmission intervals INTtx1 to INTtx5 is an optimal interval at which an inquiry signal is transmitted, calculated based on the measured response time of at least one network element 20 belonging to the NE group in question (for example, based on the group's average response time). Since the optimal transmission interval of each NE group is calculated based on the measured response time of at least one network element 20 belonging to the NE group, it is possible to set the optimal transmission interval that conforms with the line rate and distance of the SV line between the supervisory controller 10 and each NE group.

Each of the optimal response wait times Tw1 to Tw5 is a maximum wait time for which the supervisory controller 10 waits for a response signal, calculated based on the measured response time of at least one network element 20 belonging to the NE group in question (for example, based on the group's average response time). Since the optimal response wait time of each NE group is calculated based on the measured response time of at least one network element 20 belonging to the NE group, it is possible to set the optimal response wait time that conforms with the line rate and distance of the SV line between the supervisory controller 10 and each NE group.

Note that a method for calculating the optimal transmission interval and a method for calculating the optimal response wait time based on the measured response time of at least one network element 20 can be publicly known methods and are not restricted to particular ones.

1.3) Supervisory Control Operation

Hereinafter, operations of the transmission interval and response wait time control section 105 will be described by using the supervisory control database 106 shown in FIGS. 3A and 3B as an example.

First, upon system startup, the transmission interval and response wait time control section 105 stores the response time of each network element 20 measured by the response time measurement section 104, as its normal response time, in the supervisory control database 106. Additionally, the transmission interval and response wait time control section 105 may also calculate the average of the response times for each NE group and store it as the group's average normal response time in the supervisory control database 106. Further, under the control of the transmission interval and response wait time control section 105, the transmission interval determination section 107 and the response wait time determination section 108 calculate the normal supervisory control information (optimal transmission intervals and optimal response wait times) based on the measured response times or the average thereof, and store the normal supervisory control information in the supervisory control database 106. The transmission interval and response wait time control section 105 allows the transmission section 102 to transmit inquiry signals in accordance with the respective optimal transmission intervals, and determines whether or not response signals are received within the respective optimal response wait times.

Next, the transmission interval and response wait time control section 105 compares the response time of each network element 20 measured during operation by the response time measurement section 104, with the normal response time of the network element 20 in question stored in the supervisory control data base 106. If there is a difference equal to or greater than a predetermined value between the measured response time and the normal response time, it is determined that some change has been occurring in the state of communication. This change in the state of communication, as mentioned earlier, occurs in NE group units in many cases. When the state of communication has changed, the transmission interval and response wait time control section 105 updates the normal response time of the network element 20 in question, has the transmission interval determination section 107 and the response wait time determination section 108 recalculate the supervisory control information on the NE group to which the network element 20 in question belongs, and then updates the supervisory control information (optimal transmission interval and optimal response wait time) in the supervisory control database 106. Thus, the transmission interval and response wait time control section 105 controls the transmission section 102 and the reception section 104 based on the updated supervisory control information, thereby carrying out control for transmitting an inquiry signal and control for waiting for a response signal.

Incidentally, the transmission interval and response wait time control section 105 may also be implemented by a control section which controls the overall operations of the supervisory controller 10. Controls by the control section can be implemented with software, by executing corresponding functions and functional control programs on a program-controlled processor such as a CPU.

The response time measurement section 104 starts a timer when the transmission section 102 transmits an inquiry signal, and stops the timer when the reception section 103 receives a response signal to the inquiry signal. The transmission interval and response wait time control section 105 stores a value shown on the timer when it was stopped, in the supervisory control database 106 as the measured response time of the network element 20 in question.

The reception section 103, under the control of the transmission interval and response wait time control section 105, waits for a response signal in accordance with the optimal response wait time stored in the supervisory control database 106 and notifies the transmission interval and response wait time control section 105 whether or not a response signal is received within the response wait time after the transmission of the inquiry signal. When a response signal is not received within the response wait time (time-out), the transmission interval and response wait time control section 105 can give a notice to that effect by, for example, activating an alarm.

The transmission interval determination section 107, under the control of the transmission interval and response wait time control section 105, calculates the optimal transmission interval for each NE group, based on the group information and measured response time of each network element 20 stored in the supervisory control database 106. Moreover, when the transmission interval and response wait time control section 105 detects a change in the state of communication, the transmission interval determination section 107 refers to the supervisory control database 106, recalculates the optimal transmission interval for the NE group that requires updating, and gives the result of this recalculation to the transmission interval and response wait time control section 105.

The response wait time determination section 108, under the control of the transmission interval and response wait time control section 105, calculates the optimal response wait time for each NE group, based on the group information and measured response time of each network element 20 stored in the supervisory control database 106. Moreover, when the transmission interval and response wait time control section 105 detects a change in the state of communication, the response wait time determination section 108 refers to the supervisory control database 106, recalculates the optimal response wait time for the NE group that requires updating, and gives the result of this recalculation to the transmission interval and response wait time control section 105.

In a network where a plurality of network elements 20 are grouped into a plurality of groups as shown in FIG. 2, changes in the state of communication, such as an occurrence of congestion and a relief of congestion, occur in NE group units in many cases. In addition, the communication rates vary from line to line in many cases because the communication rate depends on the capacity and traffic of each SV line 30. Accordingly, the load on the supervisory controller 10 is increased if inquiries and responses used for supervisory control are managed for the individual network elements 20 in the entire network in accordance with changes in the state of communication. According to the present exemplary embodiment, as described above, the supervisory control database 106 is updated only with respect to a NE group with which the state of communication has changed, whereby optimal polling is performed, and the load on the supervisory controller 10 is reduced.

2. Example 2.1) Supervisory Control at the Time of System Startup

FIG. 4 is a sequence diagram showing polling operation when the supervisory controller 10 is started up, according to an example of the present invention.

When the supervisory controller 10 is started up and information about a NE network structure as shown in FIG. 2 is input to the transmission interval and response wait time control section 105 (S201), the transmission interval and response wait time control section 105 controls the transmission section 102 so that the transmission section 102 transmits a polling packet (health check packet) to every network element 20 in predetermined order, and also starts the timer of the response time measurement section 104 so that the response time measurement section 104 begins response time measurement (S202).

The polling packets sent out from the transmission section 102 are transmitted to the respective network elements 20 through the SV lines 30 (S203). A network element 20 that has received a polling packet performs responding processing (S204) and thereby sends back the polling packet as a loop response packet (S205).

Upon receipt of the response packet from the network element 20 in question, the response time measurement section 104 stops the timer and finishes response time measurement (S206).

The response time of each network element 20 thus measured is stored in the supervisory control database 106 as the measured response time (S207). The transmission interval and response wait time control section 105 further stores in the supervisory control database 106 the supervisory control information on each NE group, which is calculated by the transmission interval determination section 107 and the response wait time determination section 108 (S208).

Thus, the transmission interval and response wait time control section 105 transmits a polling packet to each network element 20 in each NE group based on the optimal transmission interval of the NE group, and starts supervisory control to determine whether or not a response packet is received within the optimal response wait time of the NE group (S209).

2.2) Update of Supervisory Control Database

The optimal transmission intervals and optimal response wait times are calculated as described above, and supervisory control is performed based on this supervisory control information obtained. In this state of operation, the transmission interval and response wait time control section 105 monitors measured response times and, when detecting a change in the state of communication, carries out processing for updating the supervisory control database 106. Hereinafter, this updating processing will be described specifically.

Figure 5:
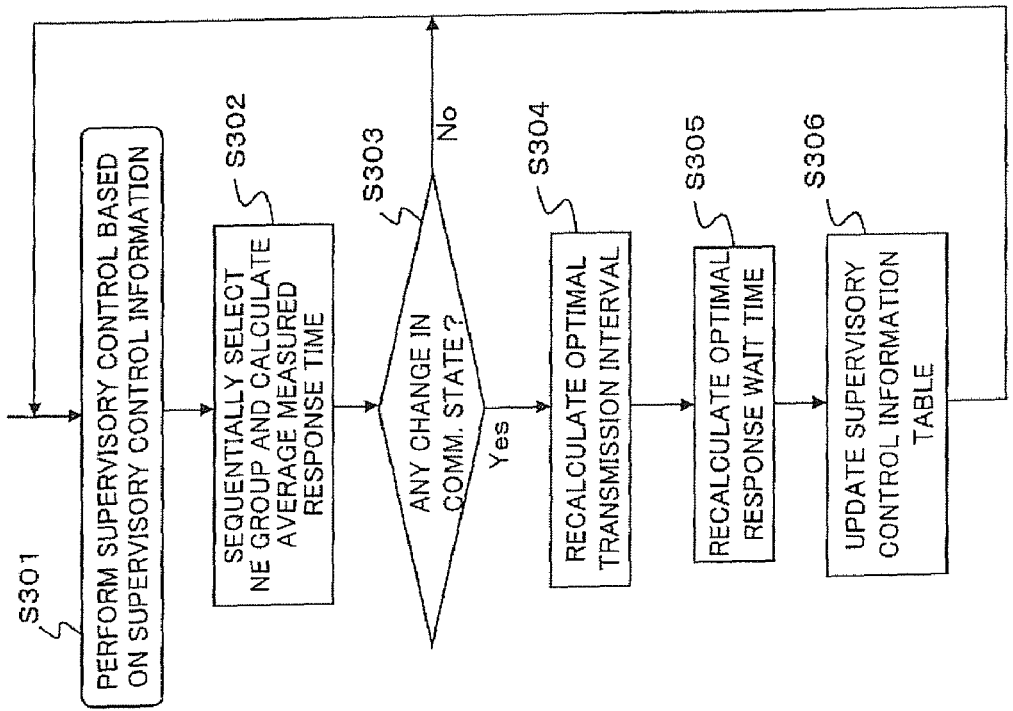
FIG. 5 is a flowchart showing the processing of updating the supervisory control database, according to the present example of the present invention.

FIG. 5 is a flowchart showing the processing for updating the supervisory control database according to the present example of the present invention. Here, it is assumed that supervisory control is carried out based on the optimal transmission intervals and optimal response wait times stored in the supervisory control database 106, and that the measured response times of the individual network elements 20 in the supervisory control database 106 (see FIG. 3A) are updated (S301).

The transmission interval and response wait time control section 105 sequentially selects a NE group from the supervisory control information table of the supervisory control database 106 and calculates the average measured response time for the NE group selected (S302). The transmission interval and response wait time control section 105 compares the calculated average measured response time with the average normal response time of the NE group in question, thereby determining whether or not there is a change in the state of communication with the NE group in question (S303). More specifically, when the difference between the average measured response time and the average normal response time is equal to or greater than a predetermined threshold value (assumed to be α), it is determined that a change has occurred in the state of communication. That is, for example, when the average measured response time is greater than the average normal response time, it can be determined that congestion has occurred in the SV line 30 with the NE group in question. When the average measured response time is smaller than the average normal response time, it can be determined that congestion on the SV line 30 is cleared.

Upon determination that a change has occurred in the state of communication (S303: Yes), the transmission interval and response wait time control section 105 instructs the transmission interval determination section 107 to recalculate the optimal transmission interval (S304) and instructs the response wait time determination section 108 to recalculate the optimal response wait time (S305). The transmission interval determination section 107 recalculates the optimal transmission interval by using the measured response time of at least one network element 20 belonging to the NE group in question, as described above. The response wait time determination section 108 recalculates the optimal response wait time by using the measured response time of at least one network element 20 belonging to the NE group in question.

The transmission interval and response wait time control section 105 updates the supervisory control information table of the supervisory control database 106 by using the recalculated optimal transmission interval and optimal response wait time (S306). Based on the thus updated supervisory control information (optimal transmission intervals and optimal response wait times), the transmission interval and response wait time control section 105 performs supervisory control (S301). When no change has occurred in the state of communication (S303: No), the transmission interval and response wait time control section 105 performs supervisory control using the supervisory control information as it is (S301).

As described above, when congestion has occurred in communication with a NE group, response delays arise with respect to the network elements 20 belonging to this NE group, compared with the response times measured at a normal time. When the average of the delays is equal to or greater than α, the supervisory control information is recalculated for the NE group with respect to which the delays are occurring, and is updated to the values at the time of congestion. Thereafter, when the congested state is cleared and a reduction of α or greater is made in the average of response times, compared with the response times for this NE group measured at the time of congestion, then the supervisory control information on this NE group is recalculated and updated to the original values at the normal time.

2.3) Effects

As described hereinabove, according to the present example, it is sufficient for the supervisory controller 10 to reset the optimal transmission interval and the optimal response wait time only for a NE group with which the state of communication has changed, and it is not necessary to update the entire supervisory control database 106. Accordingly, the relevant control load on the transmission interval and response wait time control section 105 can be greatly reduced.

Moreover, even when congestion or the like has occurred, the optimal response wait time can be reset in accordance with the state of communication, and optimal polling can be carried out without an occurrence of time-out. Moreover, when recovery to the normal state of communication is made by the clearance of congestion or the like, it is sufficient for the supervisory controller 10 to reset the optimal transmission interval and the optimal response wait time only for the NE group involved. As described above, even when a change has occurred in the state of communication, the processing load on the supervisory controller 10 can be reduced.

3. Other Examples

The present invention is not limited to the above-described exemplary embodiment and example, and various modifications are possible within the gist of the present invention.

For example, in the above-described example, it is determined whether or not a change has occurred in the state of communication by comparing the average measured response time and the average normal response time (see S303 in FIG. 5). However, the method for determining a change in the state of communication is not limited to this. For example, it is also possible to adopt a method in which a change in the state of communication is detected when at least a predetermined proportion of the plurality of network elements 20 belonging to a NE group show measured response times that are different from the normal response time by α or greater, or when at least a predetermined number of network elements 20 show measured response times that are different from the normal response time by α or greater.

Note that the network management system (NMS) 10 and the network elements (NE) 20 are not subject to constraints of the names thereof. Any system or device can be used as long as it can be connected to communication devices through communication links and can monitor the states of the communication devices by using a polling scheme.

The present invention can be applied to supervisory control systems in general in which a supervisory controller and communication devices to be monitored by the supervisory controller are connected through communication links. For example, a preferred example is an application to supervisory control by a microwave communication system that connects to a large number of base stations in a mobile telephone system.

The present invention may be embodied in other specific forms without departing from the spirit or essential characteristics thereof. The above-described exemplary embodiment and example are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A device for supervisory control of a network having a plurality of network elements, comprising:
   a communication interface which is connected to each of a plurality of element groups, wherein the plurality of network elements is grouped into the plurality of element groups; and
   a controller for controlling supervisory control information for each element group depending on a communication condition change, wherein the supervisory control is performed according to the supervisory control information,
   and wherein the controller comprises:
   a storage for storing the supervisory control information for each of the plurality of element groups, and for storing an optimal transmission interval and an optimal response wait time for each of the plurality of element groups calculated before the communication condition change;
   a detector for detecting the communication condition change for each said element group by measuring a response time for each network element of the element group and comparing an average of measured response times to an average of normal response times for the element group; and
   an update controller for updating the supervisory control information of the element group when the communication condition change for the element group has been detected, and for recalculating the optimal transmission interval and the optimal response wait time of the element group when the communication condition change for the element group has been detected,
   wherein the optimal transmission interval and the optimal response wait time are both part of the supervisory control information, the optimal transmission interval is a transmission interval at which an inquiry signal is transmitted, and the optimal response wait time is a waiting time for which a response signal to the inquiry signal is waited.

2. The device according to claim 1, wherein the detector comprises:
   a measurement section for measuring the response time from transmission of the inquiry signal until receipt of the response signal; and
   a decision section for comparing the measured response time with a normal response time to decide whether the communication condition change for the element group has occurred.

3. The device according to claim 1, wherein, when the communication condition change for the element group has been detected, the update controller updates the supervisory control information for the element group based on the response time from when the inquiry signal has been transmitted to said each network element belonging to the element group until receipt of the response signal from said each network element.

4. A supervisory control method for a network having a plurality of network elements which is grouped into a plurality of element groups, comprising:
   storing an optimal transmission interval and an optimal response wait time for each of the plurality of element groups calculated before a communication condition change, the optimal transmission interval and the optimal response wait time both being part of supervisory control information for each of the plurality of element groups, the optimal transmission interval being a transmission interval at which an inquiry signal is transmitted, and the optimal response wait time being a waiting time for which a response to the inquiry signal is waited;
   detecting the communication condition change by measuring a response time for each network element of the element group and comparing an average of measured response times to an average of normal response times for the element group; and
   controlling the supervisory control information of the element group when the communication condition change for the element group has been detected by updating the supervisory control information of the element group when the communication condition change for the element group has been detected, wherein the supervisory control is performed according to the supervisory control information, and by recalculating the optimal transmission interval and the optimal response wait time of the element group when the communication condition change for the element group has been detected.

5. The supervisory control method according to claim 4, wherein the communication condition change for the element group is detected by:
   measuring the response time from transmission of the inquiry signal until receipt of the response signal; and
   comparing the measured response time with a normal response time to decide whether the communication condition change for the element group has occurred.

6. The supervisory control method according to claim 4, wherein, when the communication condition change for the element group has been detected, the supervisory control information for the element group is updated based on the response time from when the inquiry signal has been transmitted to said each network element belonging to the element group until receipt of the response signal from said each network element.

7. A system comprising:
a network having a plurality of network elements; and
a supervisory controller for supervisory control of the network,
wherein the supervisory controller comprises:
a communication interface which is connected to each of a plurality of element groups, wherein the plurality of network elements is grouped into the plurality of element groups; and
a controller for controlling supervisory control information for each element group depending on a communication condition change, wherein the supervisory control is performed according to the supervisory control information,
and wherein the controller comprises:
a storage for storing the supervisory control information for each of the plurality of element groups, and for storing an optimal transmission interval and an optimal response wait time for each of the plurality of element groups calculated before the communication condition change;
a detector for detecting the communication condition change for each said element group by measuring a response time for each network element of the element group and comparing an average of measured response times to an average of normal response times for the element group; and
an update controller for updating the supervisory control information of the element group when the communication condition change for the element group has been detected, and for recalculating the optimal transmission interval and the optimal response wait time of the element group when the communication condition change for the element group has been detected,
wherein the optimal transmission interval and the optimal response wait time are both part of the supervisory control information, the optimal transmission interval is a transmission interval at which an inquiry signal is transmitted, and the optimal response wait time is a waiting time for which a response signal to the inquiry signal is waited.

8. The system according to claim 7, wherein the supervisory controller is connected to each of the plurality of element groups in parallel through a communication line for the supervisory control.

9. The system according to claim 7, wherein the network is a mobile communication network, and wherein each of the plurality of network elements is a base station of the mobile communication network.

10. A non-transitory computer-readable medium on which a computer program is stored, where execution of the computer program by a processor causes a method for supervisory control to be performed, the method for functioning a computer as a supervisory controller for a network having a plurality of network elements which is grouped into a plurality of element groups, the method comprising:
storing an optimal transmission interval and an optimal response wait time for each of the plurality of element groups calculated before a communication condition change, the optimal transmission interval and the optimal response wait time both being part of supervisory control information for each of the plurality of element groups, the optimal transmission interval being a transmission interval at which an inquiry signal is transmitted, and the optimal response wait time being a waiting time for which a response to the inquiry signal is waited;
detecting the communication condition change by measuring a response time for each network element of the element group and comparing an average of measured response times to an average of normal response times for the element group; and
controlling the supervisory control information of the element group when the communication condition change for the element group has been detected by updating the supervisory control information of the element group when the communication condition change for the element group has been detected, wherein the supervisory control is performed according to the supervisory control information, and by recalculating the optimal transmission interval and the optimal response wait time of the element group when the communication condition change for the element group has been detected.

* * * * *